Sept. 1, 1931.   J. W. BRYCE   1,821,087
WEIGHING SCALE
Filed June 22, 1927   3 Sheets-Sheet 1

Inventor
JAMES W. BRYCE
By his Attorney

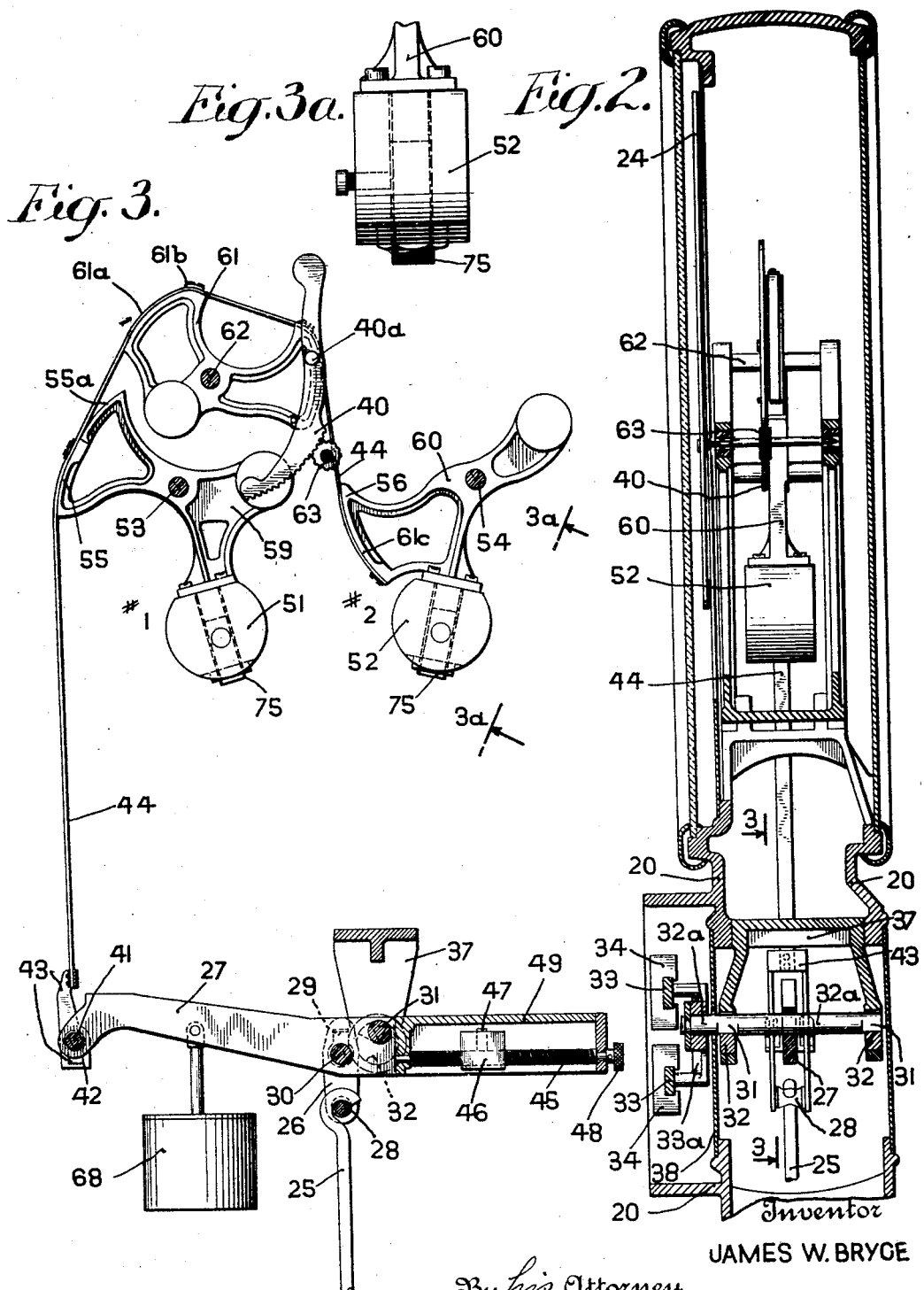

Sept. 1, 1931.   J. W. BRYCE   1,821,087
WEIGHING SCALE
Filed June 22, 1927   3 Sheets-Sheet 3
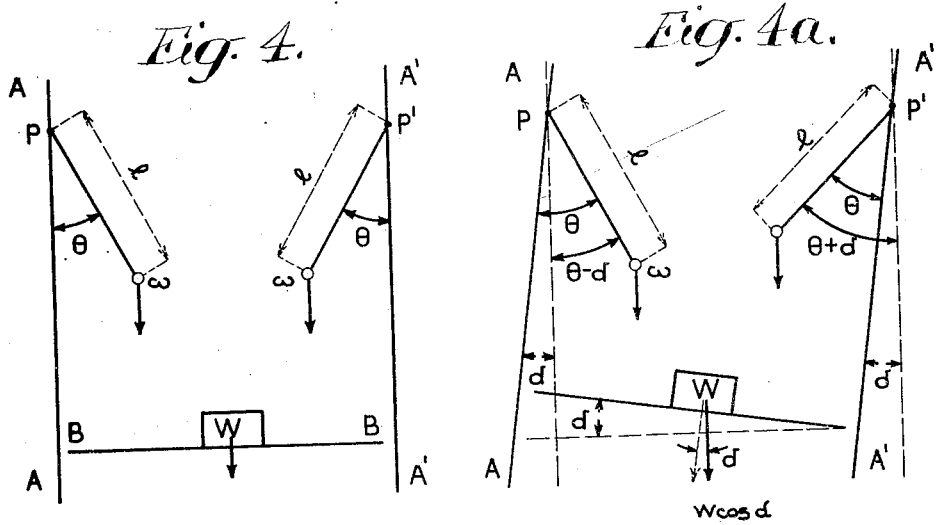
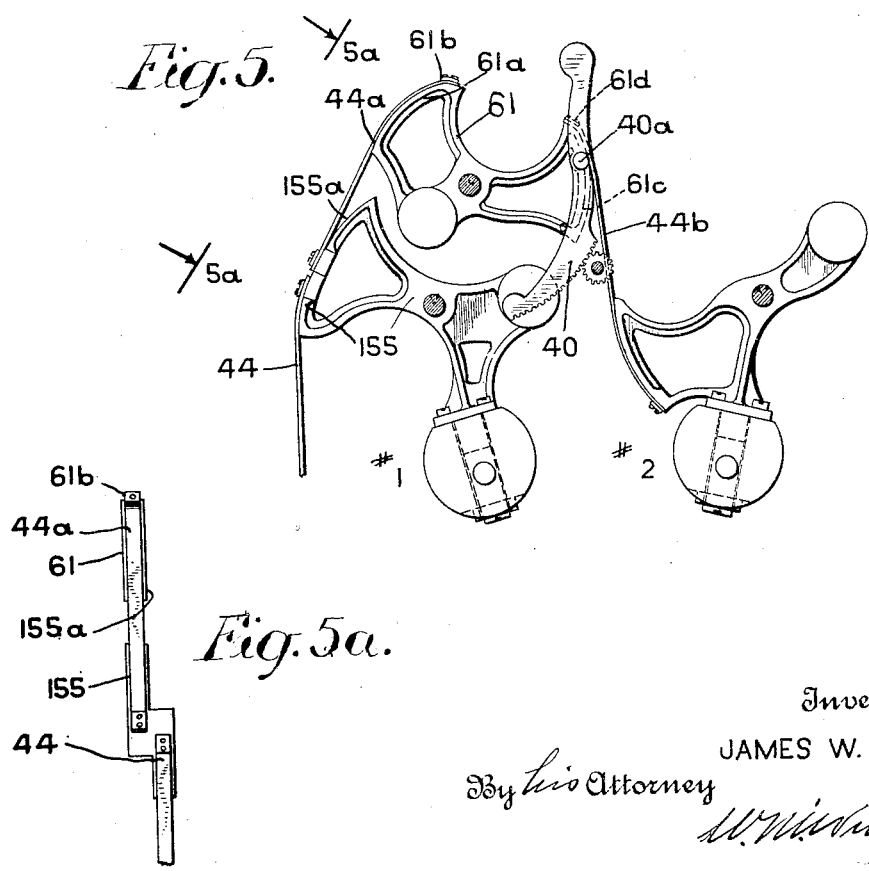
Inventor
JAMES W. BRYCE
By his Attorney Patented Sept. 1, 1931

1,821,087

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

WEIGHING SCALE

Continuation of application Serial No. 150,735, filed November 26, 1926. This application filed June 22, 1927. Serial No. 200,531.

The invention concerns weighing scales and more specifically scales of the pendulum type in which the load is offset by one or more pendulum systems which are rotated about pivot points in response to displacement of the scale beam. Scales of this type will weigh well within the limits of required accuracy if they are carefully leveled but in the case of so called "heavy capacity" scales it is often desirable to move them quickly from one place to another and such scales are often mounted on wheeled trucks for this purpose and are called portable scales. With portable scales no particular attempt is usually made to level the scale before weighing on it and in many cases where weighing operations are to be performed at the entrance of a warehouse the scale may even be placed on a slight ramp causing it to tilt appreciably from its normal upright position. Errors in weighing from such tilting are due principally to the effects on the pendulum systems and to the effects on the scale beam. It is customary to attempt to construct the scale so that the errors from these two sources compensate each other and thus cause a given load on the scale platform to effect equal displacements of the indicator when the scale is level or tilted to any reasonable angle. As the construction of the scale beam, platform and main levers is usually determined by considerations which make it impractical to adjust the tilting error in this section of the mechanism, the necessary compensation is ordinarily made in the pendulum system and this compensation necessitates adjustment which forms part of the sealing process. To this end the pendulums and pendulum supports are provided with a multiplicity of adjusting means which must be operated concurrently during sealing and the adjustment of each of which affects the adjustment of each of the others, thus making the sealing process a tedious one requiring the services of a very skillful sealer.

The present application is a continuation of my copending application Serial No. 150,735, filed Nov. 26, 1926.

According to the present invention I construct the pendulums and pendulum supports so that all necessary adjustments on each system may be made by a single adjusting device through which the center of mass of the pendulum weights may be shifted along a fixed predetermined line to change its moment about its pivot, thus permitting a single adjustment on each system to divide the weighing load as desired among the several systems and compensate for the tilting error. Furthermore as the adjustment on each system is limited to shifting the center of mass of the pendulum weight along a fixed line the effect of a given adjustment on one system can be accurately predetermined on the others.

According to the preferred form of the invention each pendulum supporting structure without the pendulum weight attached is accurately balanced about its pivot so that no unbalanced forces are effective in this part of the device. Preferably this structure is in the form of a single piece which is balanced by filing or otherwise removing surplus material so that after the initial balancing when the scale is assembled no further adjustment is necessary. The pendulum weight is then affixed to its support having its mass symmetrically distributed about a radial line extending from the pivot of the supporting structure. All adjustments of the system may then be made by shifting the center of mass of the pendulum weight along the radial line and sealing and all other necessary pendulum adjustments may be effected by this one simple adjustment.

Scales which are to automatically compensate for out of level conditions also require each pendulum to move in unison through equal angles in offsetting a weighing load, and in some cases where such results are secured equalizer devices are utilized which while permitting equal movement of displacement during weighing also permit an initial relative displacement of the pendulum relatively to each other. This action, while correcting and permitting compensation in the pendulum system per se, causes a further error when the pendulum system operates in conjunction with a platform under out of level conditions. In other double pendulum systems, where no equalizer is employed, the construction has been such that the pendulums have been held in their original relative positions initially but the adjustments of the two pendulums have been such that the center of mass of the pendulums is not adjustable solely upon a radial line from the point of pivotal support whereupon any attempt to adjust the pendulums almost invariably results in slight differences in the initial offset which again introduces the error above referred to. Such difficulties are further accentuated when the indicator driving devices are coupled directly to one of the pendulums in such a manner as to introduce their mass into the system in an unbalanced manner or in cases where such devices introduce pendulum action of their own into the system.

According to the present invention, a pendulum counterbalancing and indicator operating system is provided with double pendulums, preferably symmetrically disposed at each side of the vertical center line of the scale with means for driving the system through one pendulum, and from said pendulum operating an indicator operating means which is of itself balanced so as to exert no pendulum action. Provision is further afforded for securing the desired multiplication of drive to the indicator from said pendulum; provision is further afforded for driving the record pendulum from the indicator driving means and in view of the multiplied movement of the driving means with respect to the first pendulum provision is made for effecting a relative reduction in the driving relation to the record pendulum whereby said record pendulum will always turn through the same angle as the first pendulum. The indicator operating means also serves to reverse the direction of drive to the second pendulum so that the desired opposed motion of the pendulums may be simply secured, with proper multiplication to the indicator and close spacing of the pendulums together. Such results are furthermore secured without employing supplementary balancing adjusting devices which when manipulated to effect one adjustment introduce other effects which necessitate further supplementary adjustments elsewhere to offset the first produced objectionable effects.

The principal object of the invention is to provide a scale of the required accuracy and in which the load offsetting mechanism and its attachment to the scale beam consist of new and novel construction and arrangement of elements.

A more specific object of the invention is to provide a scale which is automatically compensated for any reasonable degree of tilting and in which new and novel means are provided to permit sealing and adjustment for compensation.

Another object of the invention is to provide a scale of the multi-pendulum type in which a single flexible element connects the several pendulum systems to the scale beam and distributes selected proportions of the load to the several systems.

Another object of the invention is to provide a scale in which all necessary adjustments on each pendulum system may be made by a single adjusting device.

Another object of the invention is to provide a scale in which the center of gravity of the pendulum system may be readily shifted along a fixed line.

Another object of the invention is to provide a scale in which the load offsetting mechanism consists of pendulum systems conforming substantially in their characteristics to simple pendulums.

Another object of the invention is to provide for a simple and improved indicator drive in a pendulum scale.

Another object of the invention is to provide for an improved indicator drive in a pendulum scale which provides the necessary multiplication of movement but which does not affect the accuracy or adjustment of the pendulum system.

Another object of the invention is to provide an improved construction for attaching tare beams to a scale.

The invention is illustrated in several exemplary embodiments in the accompanying drawings which have been chosen rather with a view to clearness in disclosure than limitation in structure and arrangement but which nevertheless include preferred forms of the device. Reference will now be had to the drawings which should be read in connection with the following detailed description and in which the same reference numerals refer to the same parts throughout the several views.

Fig. 2 shows a section on line 2—2 of Fig. 1;

Fig. 3 is a detail showing the load offsetting mechanism and the scale beam removed from the casing;

Fig. 3a is a detail elevation along line 3a—3a of Fig. 3;

Figs. 4 and 4a are diagrams illustrating the principle of operation of the scale;

Fig. 5 is a detail of a modification of the device shown in Fig. 3 in which separate tapes are employed for connecting the beam to the first pendulum, said pendulum to the intermediate operating member and said member to the record pendulum.

Fig. 5a is an elevational detail along the line 5a—5a of Fig. 5.

Figure 1:
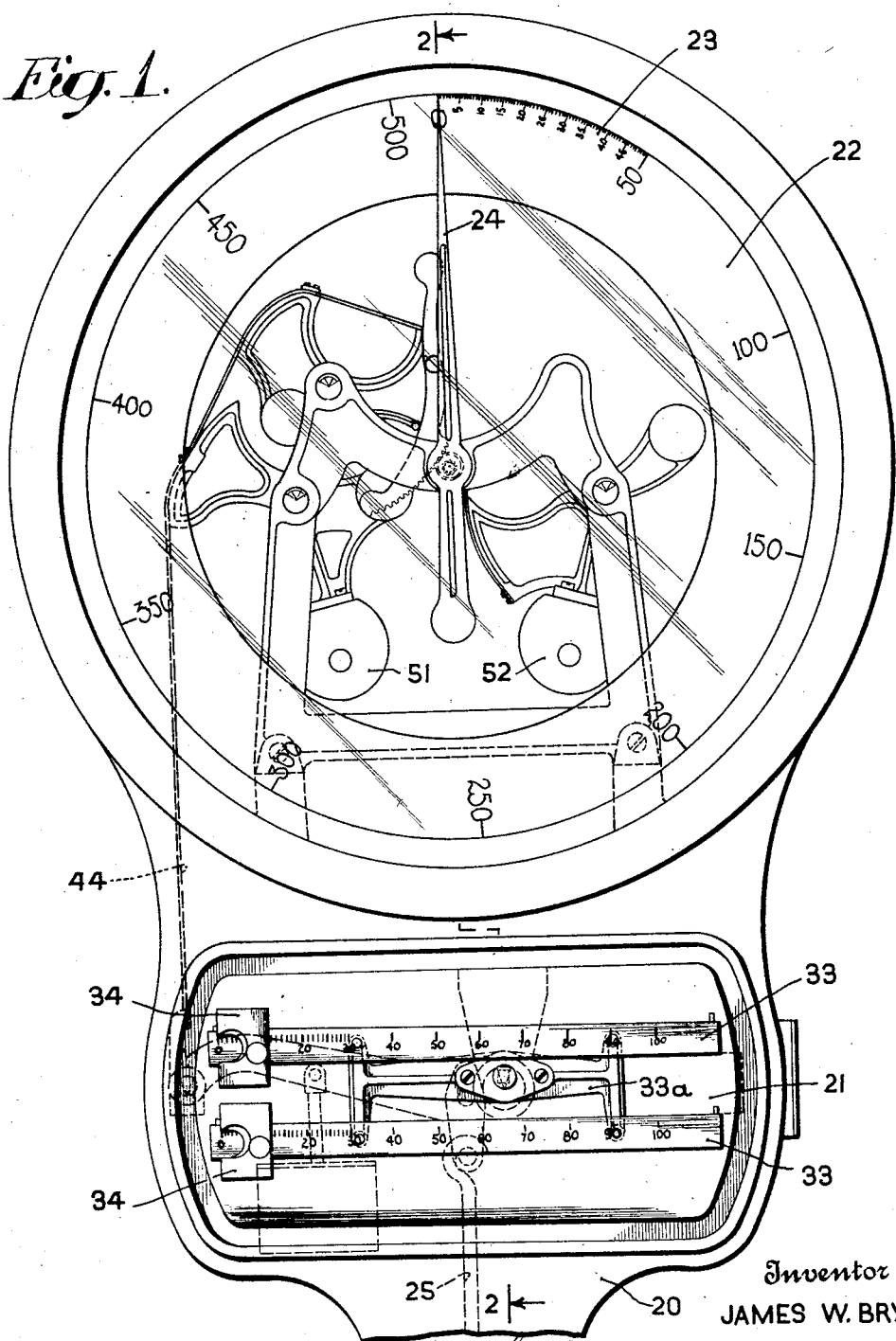
Fig. 1 shows an elevation of the upper part of the scale standard which is formed into a casing for the load offsetting mechanism and a corresponding casing for the scale beam mechanism.

The scale illustrated in Figs. 1 to 3 is of the heavy capacity type and is adapted to be mounted on a suitable truck provided with wheels to enable it to be freely moved about. As usual in such scales the main levers may be enclosed in the truck or base portion with the platform forming a top covering therefor and operatively connected with the main levers to cause displacement of them during weighing operations. This mechanism is well known and has not been illustrated in the drawings. At one end of the base the hollow standard or column illustrated in fragmentary form at 20 in Figs. 1 and 2 is supported and is provided with two enlargements indicated generally at 21 and 22 of which the former encloses the scale with its associated mechanism and the latter forms a casing for the load offsetting mechanism and supports the scale dial 23 with which the index arm 24 coacts. The main levers of the scale may be connected by means well known in the art with the steelyard 25 whose upper end is formed into a hook and engages a shackle 26 supported by the scale beam 27 to displace the latter in proportion to the displacement of the main levers. The shackle 26 consists of two side plates jointed by a short rod 28 with which the hook end of the steelyard engages and each side plate is provided with an aperture in each of which is lodged a bearing 29 to form a seat for the knife edges 30 fastened to opposite sides of the scale beam. The scale beam is fulcrumed on knife edges 31 on opposite sides thereof which seat in bearings 32 placed on the downwardly extending arms of a yoke 37 supported by the standard 20. The knife edges 31 are formed in a shaft 32a which extends through the beam and is rigidly fastened thereto and of which the portion extending toward the front of the standard projects through an opening therein and carries a diverging bracket 33a (Fig. 1) which in turn carries the tare beams 33 at its ends thus making the tare poiser 34 accessible from the outside of the scale casing. The opening in the standard is covered by a plate 38 perforated to permit the passage of the shaft 32a therethrough, thus providing a dust-proof arrangement for connecting the tare beams to the scale beam. The scale beam 27 is a lever of the second order and its nose carries a knife edge 41 seated in a bearing 42 supported by a yoke 43 which is attached to the tape 44. The tape 44 in this case forms the single connecting link between the scale beam and the load offsetting mechanism. The rear portion of the scale beam 27 is provided with a small casing 49 longitudinally of which extends a feed screw 45 for moving the zero adjusting weight 46. This weight is drilled to slide on the feed screw and is tapped to accommodate a screw 47 which may press a small piece of leather or other soft material against the screw threads, whereupon, as the weight is prevented from turning by the sides of the casing, turing of the feed screw causes the weight to move longitudinally thereof. A knurled button 48 on the end of the feed screw permits adjustment of the weight 46 when desired. The oscillations of the scale beam 27 in response to changes of load on the scale platform are suitably damped by a dash pot 68.

The flexible tape 44 is connected at its lower end to the nose of the scale beam by means of the yoke member 43 and is connected at its upper end to the load offsetting mechanism consisting of two pendulums 51 and 52 pivoted respectively at 53 and 54 and each movable in a single quadrant in response to weighing operations. The supporting member of the pendulum 51 carries a cam member 55 to which the tape 44 is attached and the supporting structure of the pendulum 52 carries a sector member 56.

The indicator pointer 24 is mounted upon the shaft 63 as will be hereinafter described. The operating means 61 is pivotally supported by knife edges 62 in suitable bearings and the construction and weighing of 61 with the rack 40 thereon is such that the complete indicator operating rocking assembly is counterbalanced about its pivotal mounting and free from pendulum action.

Multiplication of drive to the indicator and proper coordination of drive to the record pendulum is secured by making sector or arc 55a of greater radius than 61a, locating the pivot 40a at a greater distance from pivot 62 than arcuate sector 61a is located and by making 61c greater in radius than the radius of 56. The tape 44 or a separate piece of tape 44a (Fig. 5) is attached to the pendulum structure of the No. 1 pendulum preferably curving over an arcuately shaped extended portion or sector 55a preferably integral with the cam 55. The tape 44 or the other end of tape 44a (Fig. 5) is passed over a curved arcuate shaped sector 61a of an indicator operating means or member 61, and is preferably attached thereto at 61b. The indicator operating member in turn has another sector shaped arcuate surface 61c and tape 44 or a separate piece of tape 44b (Fig. 5) is preferably attached to this surface at 61d and thence extends to and over sector member 56 on the second pendulum 52. To drive the indicator pinion 63 I preferably provide a rack 40 pivoted to 61 at 40a. Part 40 is properly counterweighed to lightly enmesh the arcuate rack portion with the pinion 63. The cam 55 does not conform to an arc about its pivot 53 as it is formed to compensate for the changing moments of the offsetting pendulums. The load offsetting moment of each pendulum system is equal to the product of the mass of the pendulum times the sine of the angle which its arm makes with the vertical. But as this angle becomes progressively larger, the increment of its sine for a given change in the angle becomes progressively smaller and if the angular movement of the pendulum were the same for a given increment of load throughout its travel the load graduations on the scale dial would be unevenly spaced. The cam 55 as usual in scales of this type is designed so that in spite of the different offsetting moments of the pendulum systems a given increment of load on the scale platform will always cause an equal displacement of the index arm and consequently the graduations on the scale dial may be equally spaced from each other.

The index arm 24 is mounted on an arbor extending into the load offsetting casing and on which is fixed a small pinion 63 co-acting with a rack 40 mounted on the sector member 61. With the exception of the pendulums proper 51 and 52 all of these pivoted structures in the load offsetting mechanism are accurately balanced so that neglecting the weight of the pendulums they might freely come to rest in any position. In other words the actuating force of the load offsetting mechanism is concentrated in the pendulum weights themselves which act in the manner of a concentrated mass suspended on a weightless rigid structure. This construction permits of easy adjustment of the pendulum systems to cause each to take its desired share of the load and adjusting weights in the form of screws shown at 75 are provided for this purpose. Preferably the systems are adjusted so that each takes one half of the load when the scale is level. Fig. 3 indicates the zero registering position of the scale parts and it will be observed that the centers of mass of the pendulums 51 and 52 are not vertically beneath their pivot points but are slightly offset from this position. In other words the pendulums have been slightly rotated in opposite directions around their pivot points, the force for this initial displacement being applied to the tape 44 which is properly tensioned by the action of the scale platform and the main levers on the scale beam 27. This initial displacement of the pendulums when properly chosen in accordance with the principles stated above provides for compensating all errors due to tilting as will now be explained.

Fig. 4 shows a diagrammatical representation of the scale structure and forces when the structure is in normal upright position. The lines AA and A'A' represent vertical lines of the scale structure, when the scale is level. The scale platform is indicated diagrammatically at BB and although no operating connections are shown it will be understood that downward displacement of this platform causes the pendulums indicated at W to swing about their pivot points P and P' as indicated. A weight W on the scale platform is exerting a downward force on the scale levers and displacing the pendulums through an angle $\theta$.

Each pendulum offsets half the load and the offsetting moment of each pendulum is $w$ $l \sin \theta$ or the total offsetting moment of the two is $2 w l \sin \theta$. In this case the total gravitational pull on the weight W is effective in a direction normal to the scale platform BB.

Referring to Fig. 4a a similar condition is shown with the scale tilted at an angle $\delta$ to the vertical with the pendulums $w$ still displaced through angles $\theta$ to the lines AA and A'A' respectively although in this case the pendulum to the left is displaced through an angle $\theta - \delta$ to the vertical and the pendulum to the right is displaced through an angle $\theta + \delta$ to the vertical. In this case the load offsetting moment for the pendulum to the left is $w l \sin (\theta - \delta)$ and for the pendulum to the right is $w l \sin (\theta + \delta)$ or the total of the load offsetting moment is the sum of these, namely $w l \sin (\theta + \delta) + w l \sin (\theta - \delta) = 2 w l \sin \theta \cos \delta$. If this total moment is subtracted from the total moment derived with respect to Fig. 4 the result will be the loss in effective offsetting moment of the pendulum mechanisms due to tilting the scale. The difference in these moments is $$2 w l \sin \theta - 2 w l \sin \theta \cos \delta = 2 w l \sin \theta (1 - \cos \delta)$$

or in other words the tilting of the scale decreases the offsetting moment of the pendulum by the factor $1 - \cos \delta$.

In the case of Fig. 4 the scale platform BB is horizontal and the gravitational force of a weight W placed thereon acts normal to its surface and is totally effective in displacing the scale levers. In the case of Fig. 4a, however, the platform BB has been tilted through an angle $\delta$ to the horizontal and the weight W placed thereon is no longer fully effective in displacing the scale levers but only the component normal to the surface of the platform BB is so effective and this component is $W \cos \delta$. The effectiveness of the weight W in displacing the scale levers has therefore been reduced by an amount $W - W \cos \delta$ or $W (1 - \cos \delta)$ owing to the tilting of the scale. But as the factor $1 - \cos \delta$ represents the proportional decrease in the moment of the pendulum systems as well as the decrease in the effective pressure of the weight on the scale platform, it is obvious that a given weight will cause the same displacement of the pendulum systems and consequently of the indicator hand regardless of whether the scale is level or tilted.

This effect, of course, results from the normal offset of the pendulums about their pivots, and the compensating effect is limited to an angle equal to the initial angle of offset of the pendulums as when this angle is exceeded the moment of one of the pendulums will be reversed in direction about its pivot and the compensating effect destroyed. This angle may be made as large as desired within reason, however, and this feature presents no material limitation.

The explanation thus far has accounted for compensation for sidewise tilting but the scale may be tilted in an endwise direction. In this case the platform may also be inclined at an angle $\delta$ to the horizontal and the effective component of a weight W in displacing the scale beam is again reduced to $W \cos \delta$. Here the arms of the pendulums, while maintaining their initial angle of offset about their pivots, are each inclined at an angle $\delta$ to the vertical and as the gravitational pull on the pendulum weights still acts vertically downward the effective component of this pull on the arms is reduced to $w \cos \delta$ for each pendulum. Both the effective weighing load and the effective offsetting moment have again been decreased by the same factor, in this case $\cos \delta$, and a given weight on the scale platform causes a given displacement of the index arm in spite of tilting in an endwise direction. Tilting in any other direction will be compensated for by a combination of these effects.

Referring to Fig. 5, in which a modification of the previous arrangement is illustrated, the pendulums as before are initially offset through equal angles and their supporting structures and the intermediate indicator driving member 61 are again balanced around the pivots for all weighing positions. In this modification a separate tape is provided for connecting each sector to the next in the series. The tape 44 which at its lower end is connected to the nose of the scale beam, is connected at its upper end to the operating cam 155 of the #1 pendulum. The sector portion 155a of the #1 pendulum support is laterally offset from the cam portion 155 as may be seen in Fig. 5a to permit of more convenient machining of these portions. A second tape 44a is connected at one end to the sector 155a and at the other end to the sector 61a of the indicator driving member. The sector 61c of the latter is connected to the sector 61c of the #2 pendulum. The same proportions between the radii of the several sectors are provided as in the previous modifications so that the required multiplication of indicator drive is effected while the pendulums nevertheless are moved through equal angles during weighing operations.

The invention has now been described in regard to several physical embodiments which represent the preferred forms in which it may be practiced. It is obvious, however, that many modifications of the structure and arrangement of elements will readily occur to those skilled in the art and that the improvements in whole or in part may be applied to other scales of widely differing characteristics; for example, even a scale which is fixed may be provided with this type of mechanism in which case careful leveling of it will not be essential, and its cost of installation subsequently reduced. The invention is intended to be limited therefore only as indicated by the scope of the following claims:

1. A weighing scale including a load support, a scale beam, a pair of load counterbalancing pendulums, means comprising a flexible tape for driving one of said pendulums from said beam, an indicator and means for conjointly operating the same and for driving the other pendulum from the first said means comprising a pivotally mounted member with movement multiplying connections intermediate the same and the first pendulum and other movement decreasing connections intermediate said member and the other pendulum, and means for driving the indicator from said member.

2. A weighing scale including a scale beam, a load counterbalancing pendulum and driving connections intermediate the beam and pendulum, a pivoted indicator, indicator drive mechanism comprising a member fixed to the pivot of said indicator and an element engaging said member and pivoted at a distance from the pendulum structure and movement multiplying connections intermediate the pendulum and driving mechanism for operating the latter.

3. A weighing scale including a scale beam, a load counterbalancing pendulum having an attached sector and driving connections intermediate the beam and pendulum, an indicator element, drive mechanism for said element pivoted independently of the pendulum structure and said indicator element and provided with an attached driving sector of smaller radius than that on the pendulum and a single element for interconnecting the sectors in driving relationship operative on their separate arcs for driving the indicator drive mechanism from the pendulum with a multiplied movement.

4. A weighing scale including a scale beam, a load counterbalancing pendulum with a pivoted supporting structure and driving connections intermediate the beam and structure, an indicator, indicator driving mechanism pivoted independently of the indicator and pendulum supporting structure and a driving element connected to said structure and mechanism at different distances from their pivot points to provide for a multiplied movement between them.

5. A weighing scale including a scale beam, a load counterbalancing pendulum with a pivoted supporting structure and driving connections intermediate the beam and structure, an indicator, indicator driving mechanism pivoted independently of the indicator and pendulum supporting structure and a flexible tape connected to the structure and to the mechanism at different distances from their pivot points to provide for a multiplied movement drive between them.

6. A weighing scale including a scale beam, a pair of load counterbalancing pendulums with pivoted supporting structures, an indicator driving mechanism comprising a pivoted member, driving connections intermediate one of said supporting structures and said beam, a driving element connected to said supporting structure and to said member at different distances from their pivots to provide a multiplied movement drive for the indicator driving mechanism and a driving element connected to said member and to the other supporting structure at different distances from their pivots to provide a decreased movement drive between the member and the last named supporting structure.

7. A weighing scale including a scale beam, a pair of load counterbalancing pendulums with pivoted supporting structures, an indicator driving mechanism comprising a pivoted member, driving connections intermediate one of said supporting structures and said beam, a flexible tape connected to said supporting structure and to said member at different radial distances from their pivots to provide a multiplied movement drive for the indicator driving mechanism, and a flexible tape connected to said member and to the other supporting structure at different radial distances from their pivots to provide a decreased movement drive between the member and the last named supporting structure.

8. A weighing scale including a scale beam, a pair of load counterbalancing pendulums with pivoted supporting structures, an indicator driving mechanism comprising a pivoted member, driving connections intermediate one of said supporting structures and said beam, a sector on one of said pendulum supporting structures and a sector of smaller radius on said pivoted member with a flexible tape connecting them, another sector on said pivoted member and a sector on the other pendulum supporting structure of greater radius than the last named sector with a flexible tape connecting them, the respective radii of the several sectors being properly proportioned to effect equal offsetting of the two pendulums during weighing operations with multiplied drive to the indicator mechanism.

9. A weighing scale including a scale beam, a load counterbalancing pendulum with a pivoted supporting structure and driving connections intermediate the beam and structure, indicator driving mechanism comprising a member pivoted independently of the pendulum supporting structure, an element pivoted on said member, and connections between said pendulum structure and said member for operating said element.

10. A weighing scale including a scale beam, a load counterbalancing pendulum with a pivoted supporting structure, driving connections intermediate the beam and structure, indicator driving mechanism comprising a toothed member pivoted independently of said structure, and movement multiplying connections supported independently of said pendulum intermediate said pendulum and driving mechanism for operating the latter.

11. A weighing scale including a scale beam, a load counterbalancing pendulum having an attached sector and driving connections intermediate the beam and the pendulum, an indicator, indicator drive mechanism comprising a toothed sector pivoted at a distance from said pendulum and said indicator, and movement multiplying connections between said pendulum and said sector.

12. A weighing scale including a pendulum, an indicator, an element fixed to said indicator for driving the indicator, a member pivoted at a distance from said element and said pendulum and engaging said element to actuate the latter, and movement multiplying connections intermediate the pendulum and said member.

13. A weighing scale including a pendulum, a toothed indicator element, a pivoted gear sector for driving said element, and movement multiplying connections between said pendulum and said gear sector.

14. A weighing scale including a scale beam, a pivoted indicator, a member pivoted independently of said indicator and engaging the same to drive the latter, a pendulum connected for actuation to the beam, and movement multiplying connections intermediate said pendulum and said member for operating the latter with a multiplying movement relative to the pendulum.

15. A weighing scale including a scale beam, a pendulum structure connected thereto, a pivoted indicator, an indicator driving device supported separately from the pendulum structure and indicator, a single connecting element on the pendulum structure and driving device including portions rigid therewith, fastened to and coacting with said connecting element for causing the driving device to have a greater movement than the pendulum structure.

16. A weighing scale including a pair of pendulum structures, an indicator, an indicator driving mechanism supported separately from said pendulum structures and indicator, operating connections from opposite sides of the driving mechanism to the same side of each pendulum structure, a scale beam, and a driving connection between the scale beam and one of the pendulum structures.

In testimony whereof I hereto affix my signature.

JAMES W. BRYCE.

CERTIFICATE OF CORRECTION.

Patent No. 1,821,087.  Granted September 1, 1931, to

JAMES W. BRYCE.

It is hereby certified that error appears in the printed specification of the above numbered patent requiring correction as follows: Page 6, line 128, claim 15, after the word "element" insert a comma and strike out the word "on"; and that the said Letters Patent should be read with this correction therein that the same may conform to the record of the case in the Patent Office.

Signed and sealed this 17th day of November, A. D. 1931.

(Seal)

M. J. Moore,
Acting Commissioner of Patents.